(No Model.)
W. D. P. AIMS, Jr.
PIPE COUPLING.
No. 470,531. Patented Mar. 8, 1892.
Fig. 1.
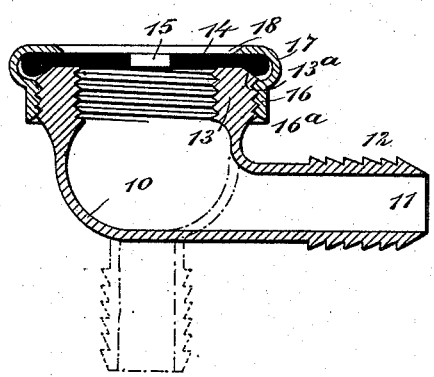
Fig. 2.
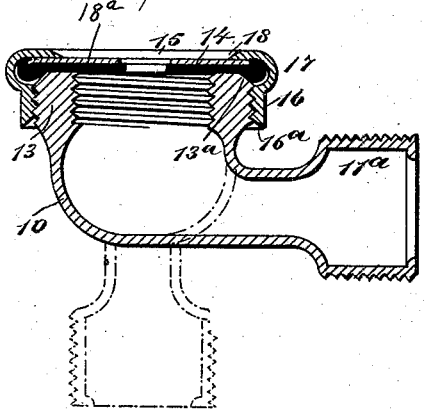
Fig. 3.
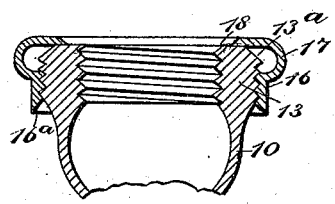
Fig. 4.
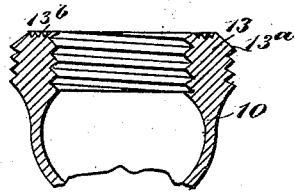
Fig. 5.
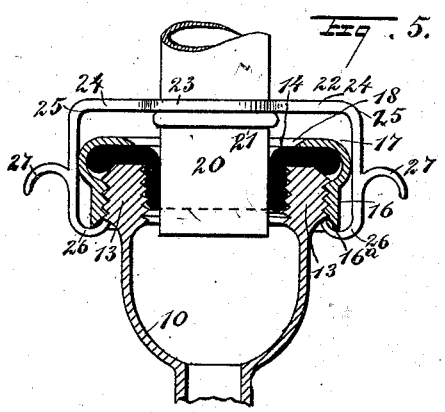
Fig. 6.
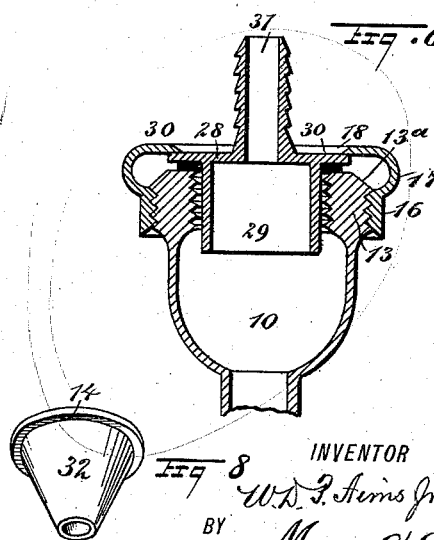
Fig. 7.
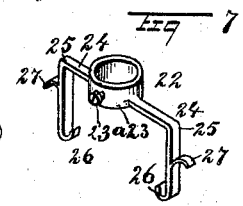
Fig. 8.
WITNESSES:
H. Walker
C. Sedgwick
INVENTOR
W. D. P. Aims Jr.
BY
Munn & Co
ATTORNEYS.

UNITED STATES PATENT OFFICE.

WILLIAM D. P. AIMS, JR., OF PHILADELPHIA, PENNSYLVANIA.

PIPE-COUPLING.

SPECIFICATION forming part of Letters Patent No. 470,531, dated March 8, 1892.

Application filed July 17, 1891. Serial No. 399,795. (No model.)

*To all whom it may concern:*

Be it known that I, WILLIAM D. P. AIMS, Jr., of Philadelphia, in the county of Philadelphia and State of Pennsylvania, have invented a new and Improved Pipe-Coupling, of which the following is a full, clear, and exact description.

My invention relates to improvements in pipe-couplings; and the object of my invention is to produce a simple form of coupling which may be used in connection with air, steam, water, or gas pipes, or, in fact, with pipes which convey any fluid and which will make an absolutely-tight joint.

To this end my invention consists in a pipe-coupling constructed substantially as hereinafter described and claimed.

Reference is to be had to the accompanying drawings, forming a part of this specification, in which similar figures of reference indicate corresponding parts in all the views.

Figure 1 is a sectional view of a coupling embodying my invention, showing the casing provided with a laterally-extending shank. Fig. 2 is a sectional view showing the shank adapted to connect with a hose or union coupler. Fig. 3 shows the coupling in section with the packing-ring removed. Fig. 4 is a broken sectional view of the coupling with the packing-ring and cap removed. Fig. 5 is a sectional view of the coupling, showing a pipe held in position therein and showing in side elevation a strengthening-clasp used in connection with high-pressure pipes. Fig. 6 is a broken sectional view of the coupling as arranged for a union. Fig. 7 is a detail perspective view of a modified form of the strengthening-clasp, and Fig. 8 is a detail perspective view showing one of the many irregular forms in which the packing-ring may be produced.

The coupling-case 10 is provided with a laterally-extending shank 11, as shown in Fig. 1; but this shank may extend in any direction and is threaded on the outside, as shown at 12, to adapt it for attachment to a pipe or other article, and the larger end of the casing is thickened, as shown at 13, and screw-threaded externally and internally, the exterior edge of the thickened portion being beveled, as shown at $13^a$, so as to enable a packing-disk 14 to be pressed firmly upon the shoulder thus formed. The shank of the case may be expanded and threaded at the end, as shown at $11^a$ in Fig. 2, to adapt it to connect with a hose or union.

The packing-disk 14 is preferably made of flexible rubber and is provided with a central aperture 15, through which a pipe may be inserted, as shown in Fig. 5; but a faucet or other device may be inserted, if desired. A screw-cap 16 screws upon the outer portion of the case 10, the said cap having a beveled lower edge $16^a$ to adapt it to easily engage a strengthening-clasp, as hereinafter described, and the upper portion of the cap is bent outward, as shown at 17, to form a space in which the disk 14 may expand, and the extreme upper portion of the cap is doubled inwardly, so as to close over the top of the casing 10, and this doubled portion terminates in a beveled edge 18, extending around a central aperture. It will thus be seen that when the cap is screwed upon the thickened end of the portion 13 the rubber disk will be bound between the cap and casing and will be held firmly in place. When a small pipe or faucet is pushed through the disk 14, a metallic washer $18^a$ may be used to stiffen the disk, and the washer is clamped between the top flange of the cap 16 and the threaded end 13 of the casing 10. In some cases the rubber disk may be removed—that is, where a pipe is to be screwed into the casing 10—and in this case the cap 16 is screwed upon the casing, thus forming an exterior finish for the same, and a recess will be formed within the opening of the cap, which recess is adapted to hold a packing-washer. In some cases the cap is omitted entirely, as well as the disk 14, and to provide for holding the packing-ring between the coupling end and the pipe, which is screwed into it, the flat end of the case is grooved, as shown at $13^b$, and these grooves, engaging the packing-ring, hold it securely in place.

In Fig. 5 I have shown the application of a pipe to the coupling. The pipe 20, which is to be secured in the coupling, is thrust in through the packing-ring 14, thus doubling the ring over, as shown in Fig. 5, and causing the portion pressed into the coupling to engage the inner thread on the case 10, and this thread, being embedded in the packing-disk, will prevent it from being displaced. Where the pressure is not very high, the pipe will remain in position and will not need reinforcement; but where the pressure is high, the pipe is provided with a rib 21, adjacent to the end which enters the coupling, and a clasp 22 is used to hold the pipe in place. This clasp has a central eye 23, which embraces the pipe and presses upon the rib 21, and extending laterally from opposite sides of the eye are arms 24, which are doubled downward at 25 and are again doubled upward and inward near their lower terminal ends, as shown at 26, thus forming hooks, which are adapted to engage the beveled edge 16ª of the cap 16. The clasp 22 has thumb-pieces 27 extending laterally from its opposite sides, and these facilitate the adjustment of the clasp. It will thus be seen that if the pressure is high, so that the tendency is to blow the pipe out of the coupling, the eye 23 will press against the rib 21 and the clasp and eye will be held in place by the bent arms 24, so that the pipe cannot be removed, and the pressure of the packing-disk on the pipe will prevent leakage. In case the pipe 20 is not provided with a rib 21 the eye 23 of the clasp is thickened to form a collar, as shown in Fig. 7, and the collar is provided with a set-screw 23ª, by means of which the clasp may be secured to the pipe.

In Fig. 6 I have shown the coupling as arranged to form a union, and in this case a casting 28 is used, which has a depending cylinder 29, adapted to enter the opening of the coupling-casing, an annular flange 30, arranged around the upper edge of the cylinder, and a vertical shank 31, which is adapted to be secured to a pipe or other article. The casting 28 is placed in position. A packing-disk is inserted between the flange of the casting and the top of the case 10, and the screw-cap 16 is then screwed upon the coupling-case. The upper portion of the cap will thus be made to bear upon the flange of the casting, and the casting will consequently be held in place and a tight joint effected.

In Fig. 8 I have shown a modified form of the packing-disk 14, and it is obvious that the disk may be made in other peculiar shapes to adapt it to any change in the conformation of the case in which it is used.

Having thus described my invention, I claim as new and desire to secure by Letters Patent—

1. A pipe-coupling comprising a case having a thickened end which is externally and internally screw-threaded, the exterior edge of the thickened end being beveled, a cap having its flange internally screw-threaded and provided with an aperture in its top and with an annular space around the top, and an apertured packing, substantially as herein shown and described.

2. A pipe-coupling consisting of a case having one end thickened and internally and externally screw-threaded, the exterior edge of said end being beveled, a cap having its flange internally screw-threaded and provided with an aperture in its top and with an annular space around said top, an apertured packing-disk, and an apertured plate between the cap and packing, substantially as herein shown and described.

3. The combination, with a coupling-case having a thickened end threaded externally and internally and a screw-cap shaped to fit the case and having a beveled lower edge, of a clasp adapted to extend across the cap, said clasp having a central eye to receive a pipe and hooked lower ends to engage the beveled edge of the screw-cap, substantially as described.

4. The combination, with a coupling-case having a thickened threaded end and a screw-cap adapted to fit upon the case, of a clasp having an annular flange, a depending cylinder, and a shank aligning with the cylinder, the shank being adapted for connection with a pipe or other article, substantially as described.

WILLIAM D. P. AIMS, Jr.

Witnesses:
 EDWIN S. BENTLEY,
 SHERMAN BENTLEY.